United States Patent
Murphey et al.

(10) Patent No.: US 6,250,336 B1
(45) Date of Patent: Jun. 26, 2001

(54) WATER SUPPLY COUPLING WITH ONE-WAY VALVE FOR RECREATIONAL VEHICLES

(75) Inventors: Britt Murphey, Elkhart; De Von Smith, Wakarusa, both of IN (US)

(73) Assignee: B&B Molders, Mishawaka, IN (US)

( * ) Notice: Subject to any disclaimer, the term of this patent is extended or adjusted under 35 U.S.C. 154(b) by 0 days.

(21) Appl. No.: 09/236,154

(22) Filed: Jan. 22, 1999

(51) Int. Cl.[7] .................................................. F16K 21/08
(52) U.S. Cl. ...................... 137/899; 137/539; 137/539.5; 137/543.17
(58) Field of Search ................................ 137/560, 543.19, 137/543.17, 539, 533.31, 543.13, 543.15, 899, 351, 354, 539.5, 543.21

(56) References Cited

U.S. PATENT DOCUMENTS

| | | | |
|---|---|---|---|
| 86,273 | * | 1/1869 | Blake . |
| 2,055,601 | * | 9/1936 | Dodge .................................. 184/105 |
| 2,066,122 | | 12/1936 | Ravelo .................................... 137/69 |
| 2,840,101 | * | 6/1958 | Saylor .............................. 137/899 X |
| 2,896,663 | | 7/1959 | Mena .................................... 137/539 |
| 2,945,508 | | 7/1960 | Schweisthal .......................... 137/515 |
| 3,335,750 | | 8/1967 | Kepner ............................... 137/515.5 |
| 3,421,547 | | 1/1969 | Aslan .................................... 137/539 |
| 3,791,406 | | 2/1974 | Philips ............................... 137/515.5 |
| 3,894,556 | | 7/1975 | Pareja .................................... 137/539 |
| 3,995,463 | * | 12/1976 | Mikos .................................... 70/388 |
| 4,073,521 | * | 2/1978 | Mena .............................. 292/256.65 |
| 4,080,981 | * | 3/1978 | Stewart ................................. 137/218 |
| 4,527,295 | * | 7/1985 | Lacore ...................................... 4/321 |
| 4,744,385 | * | 5/1988 | Houghton ............................. 137/255 |
| 5,033,280 | * | 7/1991 | Johnson .................................. 70/232 |
| 5,046,526 | | 9/1991 | Longmore et al. ............... 137/515.5 |
| 5,107,890 | | 4/1992 | Gute ...................................... 137/539 |
| 5,183,075 | * | 2/1993 | Stein ..................................... 137/539 |
| 5,404,904 | * | 4/1995 | Glaser ................................... 137/539 |
| 5,421,362 | * | 6/1995 | Sordello ................................ 137/351 |
| 5,507,310 | * | 4/1996 | Sordello et al. ...................... 137/351 |
| 5,538,031 | * | 7/1996 | Brence et al. ................... 137/899 X |
| 5,761,763 | * | 6/1998 | McAllise et al. ....................... 15/320 |
| 5,794,657 | * | 8/1998 | Oberg ............................... 137/543.19 |

\* cited by examiner

*Primary Examiner*—John Rivell
(74) *Attorney, Agent, or Firm*—Leydig, Voit & Mayer, Ltd.

(57) ABSTRACT

On a recreational vehicle, a water supply coupling is provided to permit the hookup of an external water supply to the plumbing of the recreational vehicle. The coupling selectively permits one-way flow into, but not out from, the plumbing, thereby maintaining the pressurized integrity of the plumbing system. The coupling has a movable check member which may be seated against an annulus to create a seal. In various disclosed embodiments, the check member may be a check ball, a mushroom-shaped check member having a hemispherical seating portion and a stem, and a two-piece check member.

21 Claims, 5 Drawing Sheets

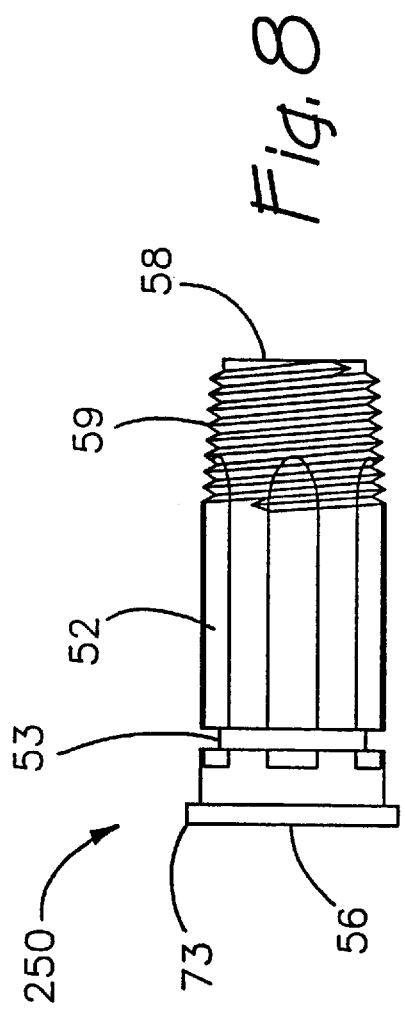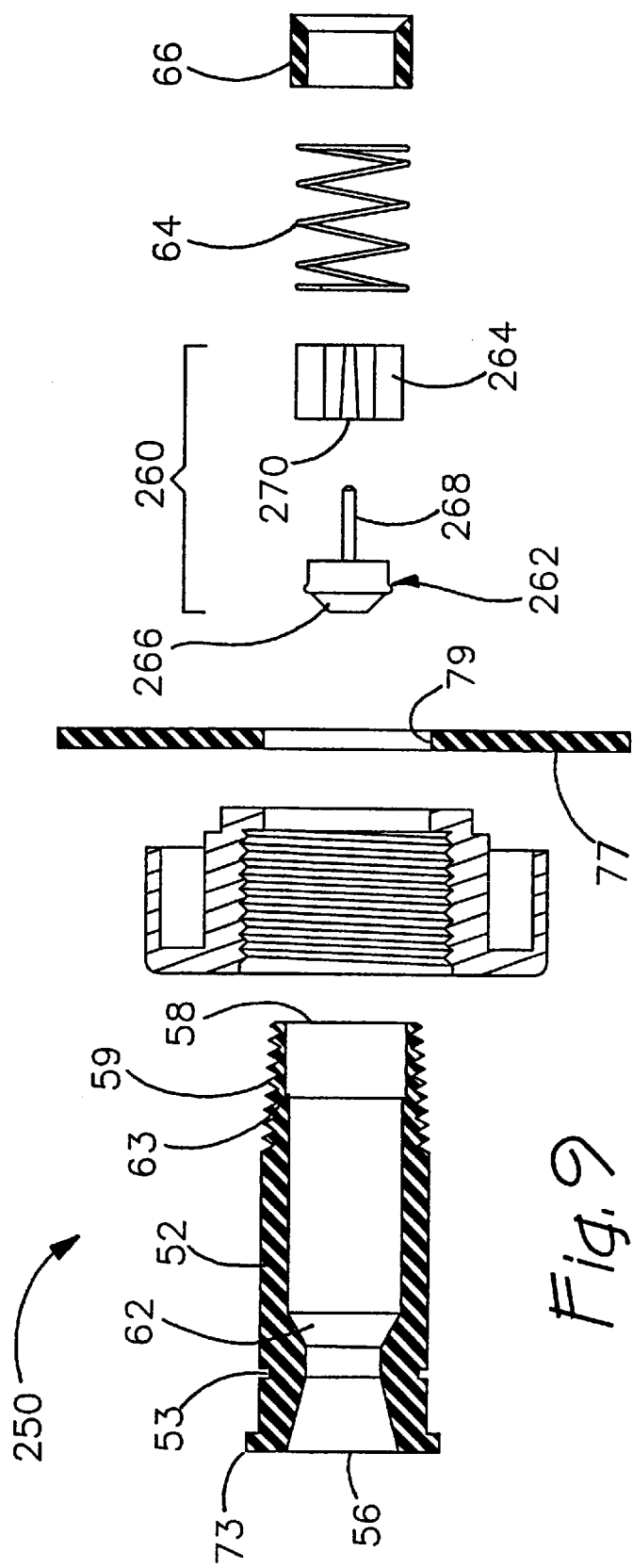

WATER SUPPLY COUPLING WITH ONE-WAY VALVE FOR RECREATIONAL VEHICLES

BACKGROUND OF THE INVENTION

The present invention generally relates to fluid couplings and more particularly relates to water supply couplings for land or marine recreational vehicles and the like.

Recreational vehicles, such as campers and boats, are conventionally equipped with interior plumbing. This plumbing facilitates the operation of running water conveniences such as sinks, showers, toilets, and the like. In a recreational vehicle, the interior plumbing system includes a pump to pressurize the pipes to cause a desired water flow. Accordingly, the plumbing system must be sealed in order to maintain this pressure.

The recreational vehicle typically has a tank or reservoir to store a predetermined amount of water. This tank is filled from an external water supply through a coupling which may be mounted in a wall of the vehicle for convenient external access. When a recreational vehicle is parked or docked, it is desirable to connect the interior plumbing to an external water supply, such as city water. This coupling desirably acts as a one-way valve which permits flow into, but not out from, the interior plumbing so that the plumbing system may be pressurized.

The externally-supplied water is typically delivered through a flexible hose having a standard threaded end portion. The end portion is securable to the coupling of the recreational vehicle in a substantially water-tight manner. Thus, the hose and water supply coupling is mounted in fluid communication with the plumbing system of the recreational vehicle.

A conventional water coupling for a recreational vehicle has included a one-way valve mechanism utilizing a plunger axially movable within a water passage. The conventional plunger has a radially-extending flange with a groove for accommodating an elastic O-ring. A spring biases the plunger toward a closed position wherein the O-ring contacts a beveled surface in the passage. When the O-ring properly contacts the beveled surface, a seal is formed to prevent unintentional flow through the coupling outwardly from the interior plumbing system and thus, maintaining the pressurized integrity of the plumbing system.

Unfortunately, such a conventional water coupling is susceptible to failure. Specifically, it has been found that the O-ring can be dislocated from its groove under conditions of high water flow or high water pressure. When this occurs, the plunger fails to effectively seal the passage, rendering the conventional coupling ineffective for preventing an outward flow of water from the plumbing system and maintaining the pressurized integrity of the plumbing system. Repairing this problem has required disassembly of substantially the entire coupling or replacement of the coupling altogether.

Therefore, it is desirable to provide a one-way water supply coupling for a recreational vehicle that is reliable. Furthermore, a need exists for an improved water supply coupling which has few parts and which eliminates a need for an O-ring.

SUMMARY OF THE INVENTION

The invention provides an improved water supply coupling for permitting one-way flow from an external water supply to an internal plumbing system of a recreational vehicle. The coupling includes a tubular body and a check member that moves axially to open and close a cavity extending through the body. In one embodiment, the check member is a spherical check ball. In another embodiment, the check member is a unitary plunger. In a further embodiment, the check member generally has a "mushroom" shape, including a hemispherical seat portion and a stem portion. The unique construction of the check member eliminates the need for a conventional O-ring because the unitary check ball is urged in sealable contact directly against an annular beveled surface within the body, creating an effective seal to prevent leakage of fluid through the coupling in a closed condition.

Additional features and advantages of the present invention are described in, and will be apparent from, the disclosure herein, including the drawings.

BRIEF DESCRIPTION OF THE DRAWINGS

FIG. 8 is a side elevational view of a coupling according to another embodiment of the invention; and FIG. 9 is an exploded, sectional view of the coupling of FIG. 7.

DETAILED DESCRIPTION OF THE PREFERRED EMBODIMENTS

Figure 1:
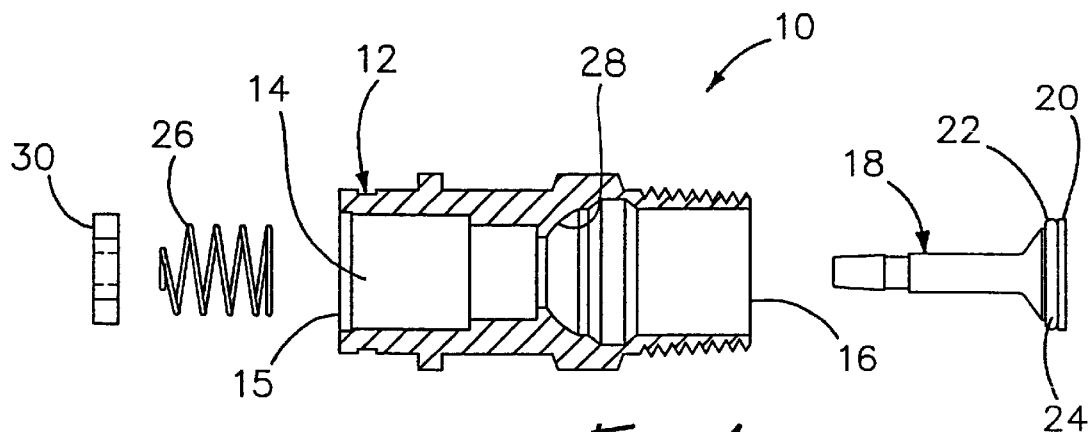
FIG. 1 is an exploded, sectional view of a prior art water supply coupling.
Figure 2:
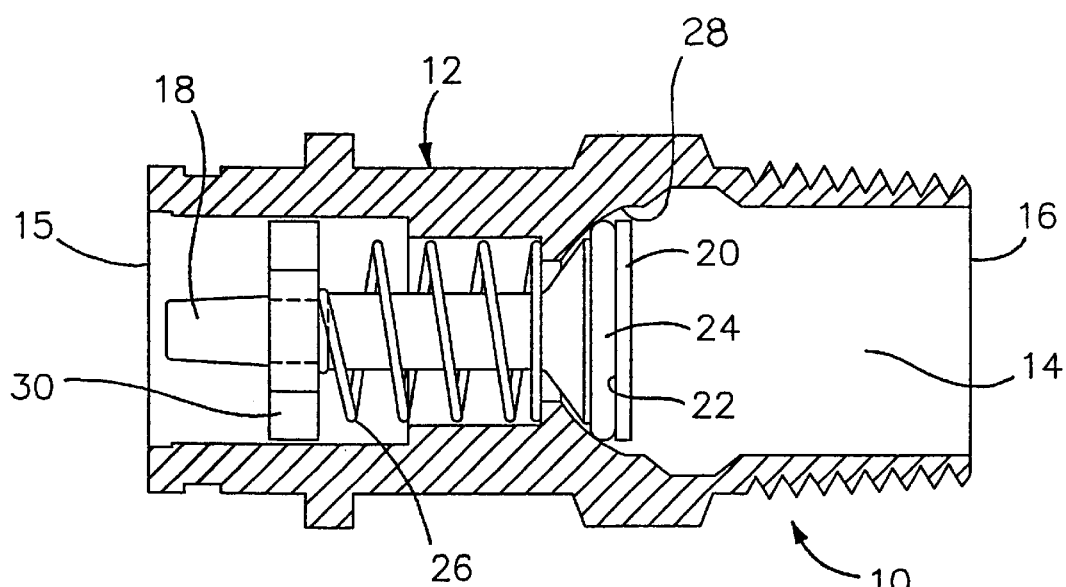
FIG. 2 is a sectional view of the valve of FIG. 1 in an assembled condition.

Referring to the FIGURES, wherein like numerals designate like components, FIGS. 1 and 2 illustrate a prior art water supply coupling 10 for a recreational vehicle. The coupling 10 includes a generally tubular body 12. A central passage 14 extends through the body 12. The body 12 has a first end 15 which is connectable to an external water source, such as a hose delivering water, and a second end 16 which is connected to the interior plumbing (not shown) of the recreational vehicle.

For permitting one-way flow, the prior art coupling 10 of FIGS. 1 and 2 has a movable plunger 18 with a radially-extending flange 20. A circular groove 22 is disposed in the flange 20 to accommodate a separate elastic O-ring 24. The plunger 18 is mounted for axial movement within the passage 14. A spring 26 biases the plunger 18 toward a closed position wherein the O-ring 24 contacts a beveled surface 28 of the body 12, forming a seal. A bridge 30 is mounted to the body 12 to extend across the passage 14 to guide the axial movement of the plunger. As discussed above, however, the O-ring 24 can become undesirably dislocated as a result of high water flow or pressure, rendering the coupling ineffective for sealing the plumbing system. Typically, the body 12 of the conventional coupling 10 has been made of brass.

Figure 3:
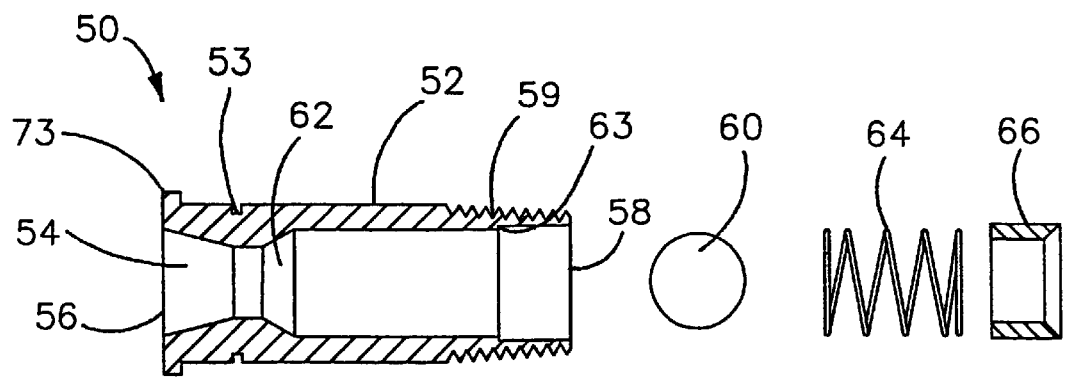
FIG. 3 is an exploded, sectional view of one embodiment of a water supply coupling for a recreational vehicle according to the present invention.
Figure 4:
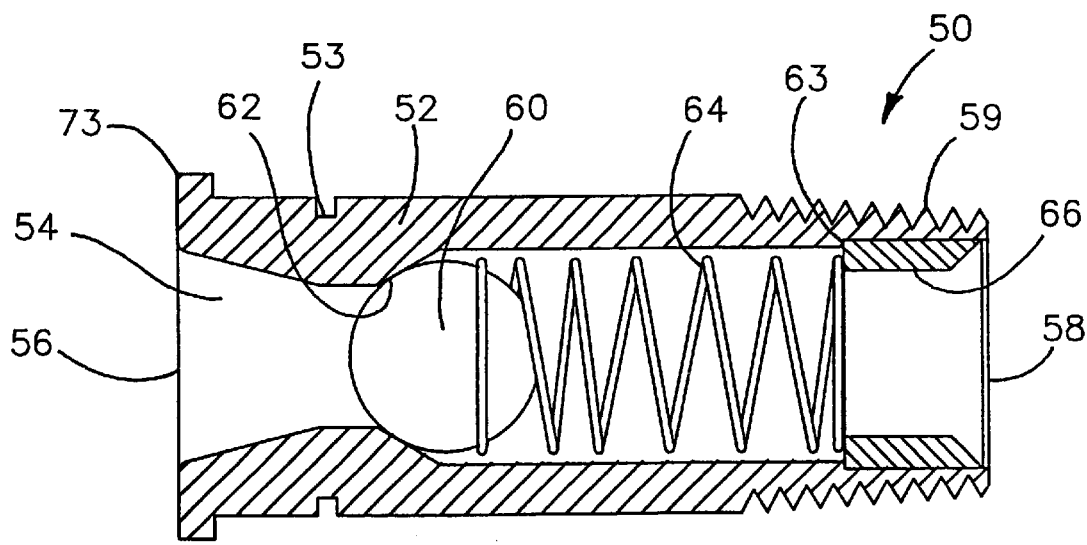
FIG. 4 is a sectional view of the coupling of FIG. 3 in an assembled condition.

In accordance with certain objects of the invention, various embodiments of a novel coupling 50 are illustrated in FIGS. 3–9. Referring to FIGS. 3–4, the illustrated embodiment of the coupling 50 includes a generally tubular body 52 with a central bore 54 extending therethrough. The body 52 has a first end 56 which may be connected to a water supply (not shown). The body 52 has a second end 58 which may be connected to the plumbing 105 of a recreational vehicle.

Figure 6:
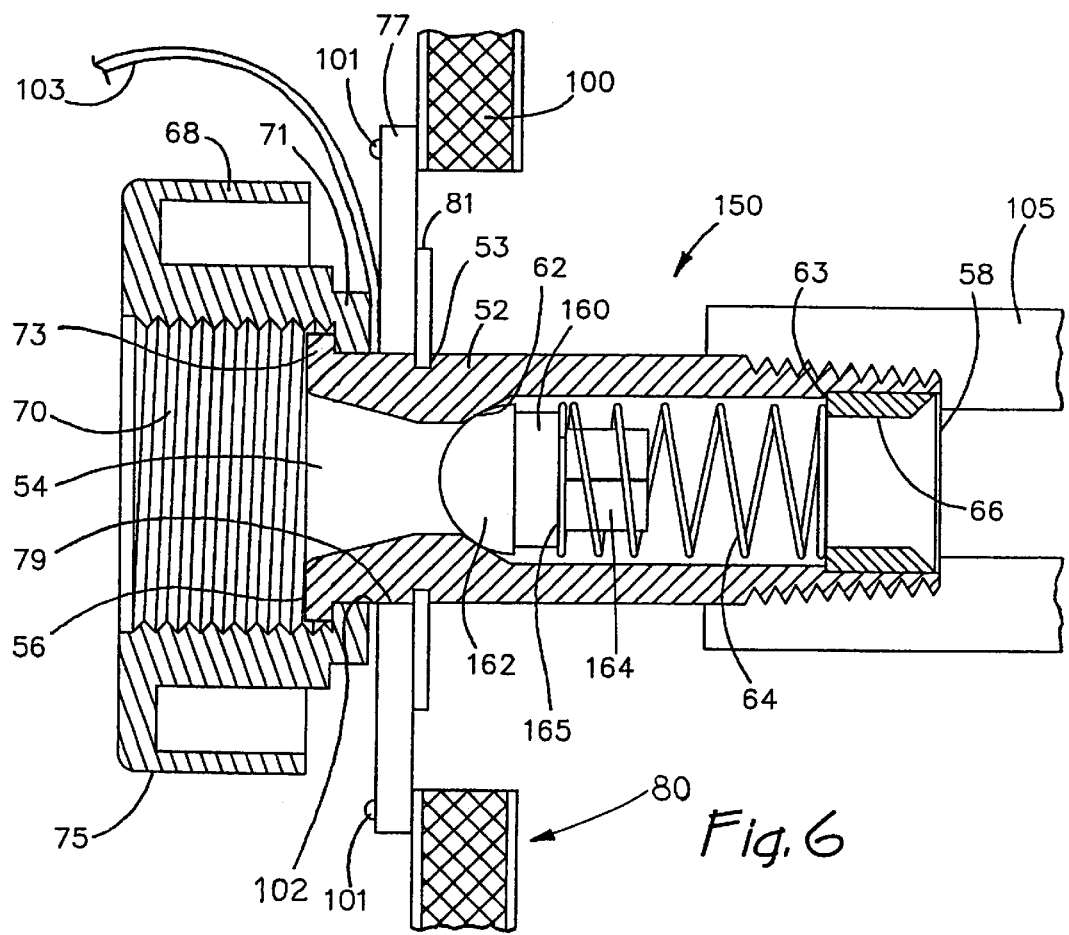
FIG. 6 is a sectional view of the coupling of FIG. 5 in an assembled condition, and attached to a wall of a recreational vehicle.
Figure 7:
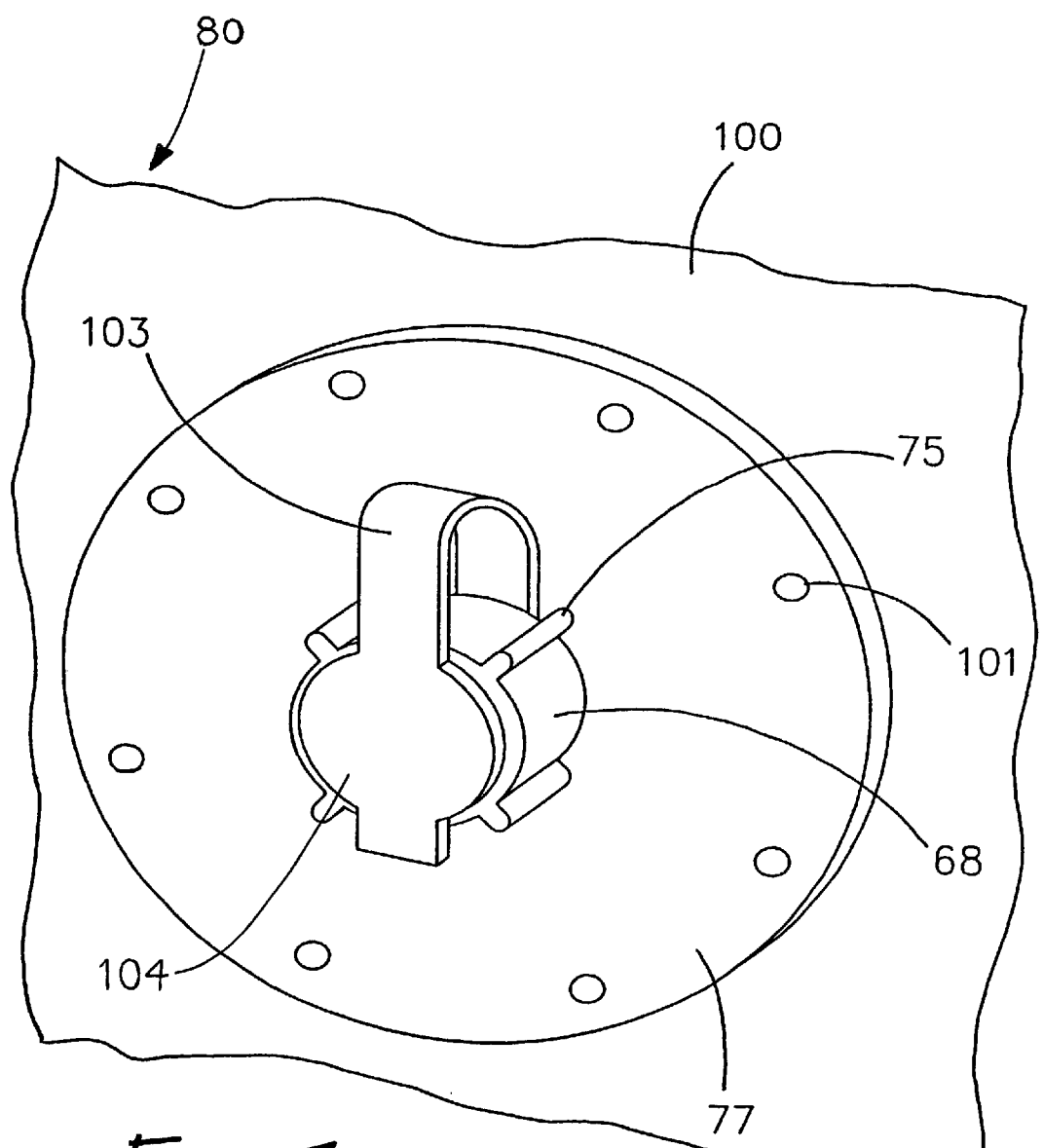
FIG. 7 is a perspective of the coupling of FIG. 5 in an assembled condition and attached to the wall of the recreational vehicle.

The body 52 is mounted to extend through a wall 100 of a recreational vehicle so as to permit hook-up to a water supply hose from a water supply external to the recreational vehicle 80 (generally shown in FIGS. 6–7). Accordingly, the body 52 has an axial length suitable to extend through the wall 100 as needed. Additionally, the body 52 is configured to be mounted in a secure manner to a wall or wall panel 100 of the recreational vehicle as discussed in more detail below. The body 52 is preferably made of durable plastic, although any suitable material such as metal may be used.

In one embodiment of the invention, the coupling 50 permits one-way flow from the water supply to the plumbing system 105 to maintain pressurization of the plumbing system. More particularly, the coupling 50 permits flow through the bore 54 from the first end 56 to the second end 58. The coupling 50 has a check member 60, such as a unitary spherical check ball as illustrated in FIGS. 3–4, which is movably disposed in the bore 54. The bore 54 has a beveled annulus 62 which has a radius smaller than the check member 60 to prevent the check member 60 from by-passing the annulus 62. The annulus preferably conforms to the configuration of the outer periphery of the check member 60 so as to receive the check member 60 and form a seal therebetween. In order to prevent outward flow (i.e., from the second end 58 to the first end 56), the check member 60 may be seated in sealed contact against the annulus 62 formed in the bore 54. When the check member 60 is seated against the annulus 62, the check member 60 is in a closed position and the bore 54 is closed, as generally illustrated in FIG. 4, and the plumbing system 105 will remain pressurized.

When water is delivered from the first end 56 at a pressure higher than the plumbing pressure at the second end 58 (and the relatively small spring biasing force), the check member 60 moves to an open position away from the annulus 62, permitting water to flow into the plumbing system to fill the reservoir aboard the vehicle and repressurize the system. However, when the plumbing is pressurized for use, the check ball 60 seats against the annulus 62, preventing outward flow.

In one embodiment of the invention, the check member is a unitary piece preferably made of a rubber-like material or having a rubber-like coating. A preferred material is santoprene™ or other suitably resilient thermoplastic, including those listed for use with potable water. Because the check member is made of such a rubberized material, the check member has been found to effect a reliable seal against the annulus 62 in the bore 54, thus eliminating the need for another additional resilient element such as an O-ring.

The coupling 50 may include a biasing element, such as the illustrated coil spring 64, located in the bore 54 to bias the check member 60 toward the closed position. The spring 64 is held in the bore 54 by a ring member 66 secured in the second end 58 of the body 52. The ring member 66 may be threadably engaged with the body 52 to facilitate easy assembly and disassembly of the coupling 50. Other methods to attach the ring member 66 and the body 52 will be known to those skilled in the art. For assembly, the check member 60 is placed into the bore 54, followed by the spring 64. The second end 58 may have an internal shoulder 63 to limit insertion of the ring member 66. The ring member 66 is then secured in the second end 58 of the body 52 against the spring 64. Of course, these steps are reversed to disassemble the coupling 50.

Figure 5:
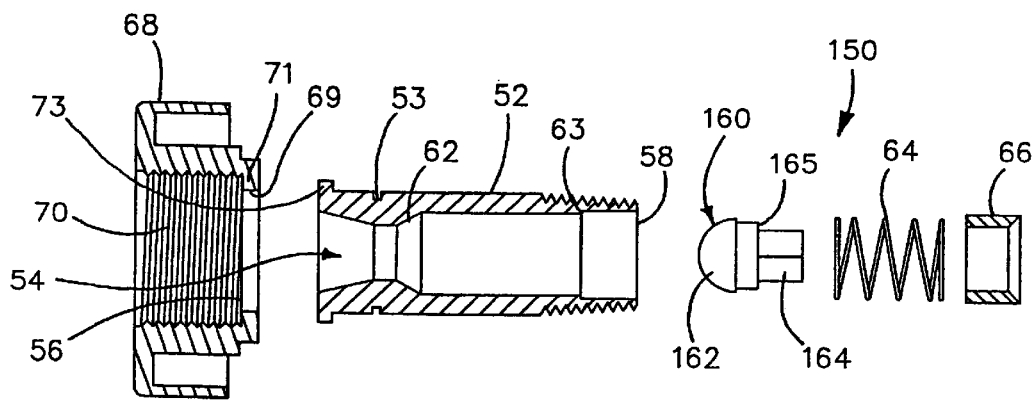
FIG. 5 is an exploded, sectional view of a water supply coupling according to another embodiment of the invention wherein the check member is generally mushroom-shaped.

Referring to FIGS. 5 and 6, a coupling 150 according to another embodiment of the invention is illustrated. The coupling 150 is similar to the coupling 50, described above in connection with FIGS. 3 and 4, except that the coupling 150 includes a check member 160 which is generally mushroom-shaped. More specifically, the check member 160 of FIGS. 5 and 6 has a hemispherical seating portion 162 and a stem portion 164 configured to securely engage the coil spring 64. The hemispherical seating portion 162 may be seated against the annulus 62 to sealably close flow communication through the bore 54, as described above in connection with FIGS. 3 and 4. The stem portion 164 may have a shoulder 165 so that the spring 64 may bias the check member 160 against the annulus 62.

In order to facilitate a convenient connection to an external water supply, the embodiments of the coupling shown in FIGS. 3–9 may include a hose-mounting ring 68. One embodiment of the mounting ring 68, illustrated in FIGS. 5–7, has a central hole 69 dimensioned to slidably engage the outer periphery of the coupling body 52. The hole 69 has a flange 71 for engaging a cooperating flange 73 on the coupling 150. Engagement between the ring flange 71 and the coupling flange 73 limits movement of ring 68 and coupling 150. The mounting ring 68 preferably has threads 70 on a central bore configured to receive the corresponding end of a hose (not shown) from the external water supply. It will be appreciated that the mounting ring 68 may rotate relative to coupling 150 to facilitate threaded engagement of the hose. The mounting ring 68 may also have a plurality of manipulable ridges 75 to facilitate rotation of the mounting ring 68 to selectively connect or disconnect the hose.

In accordance with certain objects of the invention, embodiments of the coupling may also be adapted to facilitate attachment of the coupling to the recreational vehicle 100. Referring to FIGS. 5–7, a mounting plate 77 has a central hole 79 adapted to slidably engage the outer periphery of the coupling body 52. The coupling body 52 has a groove 53 spaced inboard of the coupling flange 73. A U-shaped lock 81 may be used to slidably engage the groove 53, as best shown in FIG. 6, to lock the mounting plate 77 between the flange 73 and the lock 81. Thereafter, the mounting plate 77 may be attached to the wall 100 of the recreational vehicle using screws 101, bolts and the like. A flexible plug 103 for selectively closing the mounting ring 68 may also be attached to the coupling. In the illustrated embodiment, the plug 103 has a central hole 105 for slidably engaging the coupling body 52. The plug 103 may be disposed between the mounting plate 77 and the coupling flange 71. One end 104 of the plug 103 may be adapted to selectively cover the central bore of the mounting ring 68. FIG. 6 also schematically illustrates the plumbing system 102 of the recreational vehicle. The second end 58 of the coupling 150 may have threads 59 or other means to facilitate a connection with the plumbing system 105.

FIGS. 7 and 8 illustrate a coupling 250 according to a further embodiment of the invention. The coupling 250 is similar to that described above in connection with FIGS. 3–6, except that the coupling 250 has a check member 260 in the form of a seating portion 262 having a generally circular or frustoconical seating surface 266. An integral stem 268 extends from the circular seating portion 262. A base portion 264 having a cavity 270 shaped to receive the stem 268, may also be provided to support the seating portion 262 and positively engage the spring 64.

It should be understood that the present invention has been described herein with reference to various exemplary embodiments, but that the invention is not limited to those embodiments. Rather, various changes and modifications to the described embodiments will be apparent to those skilled in the art, and such changes and modifications may be made without departing from the spirit and scope of the invention. Accordingly, such changes and modifications are intended to be covered by the appended claims.

What is claimed is:

1. A water supply coupling for use in a pressurized plumbing system in a recreational vehicle, the recreational vehicle having a wall, the water supply coupling comprising:
    a tubular body configured to be mounted in the vehicle wall, the body has first and second body ends and a central bore, the central bore having a first bore end for receiving fluids and a second bore end for attaching to and delivering fluids to the pressurized plumbing system,
    a sealing annulus formed in the central bore between the first and second bore ends,
    a check member disposed in the bore for movement between an open position away from the sealing annulus wherein water may flow through the body and a closed position seated against the sealing annulus wherein water may not flow through the body, and wherein the check member is formed of a unitary material for forming a seal with the sealing annulus,
    a spring disposed in the bore between the check member and the second bore end for biasing the check member toward the closed position,
    a ring member slidably insertable into the bore between the spring and the second bore end wherein the ring member seats against the pressurized plumbing system in use so as to secure the ring member in the bore and resist the biasing force of the spring,
    the tubular body has external threads at the second body end for attachment to the pressurized plumbing system and an outwardly projecting body flange projecting outwardly from the first body end, and
    a mounting ring having an inwardly projecting mounting ring flange and a central passage for slidably and rotatably engaging the periphery of the tubular body and limiting movement between the tubular body and mounting ring in response to engagement between the body flange and mounting ring flange.

2. The water supply coupling according to claim 1 wherein the mounting ring has at least one hand-manipulable ridge to facilitate rotation of the mounting ring.

3. The water supply coupling according to claim 1 wherein the mounting ring bore has interior threads for connection to a water supply in response to rotation of the mounting ring.

4. The water supply coupling according to claim 1 comprising a plate having a central hole for slidably engaging the periphery of the tubular body and fastening holes for attachment to the vehicle wall wherein the plate is disposed along the tubular body so as to hold the mounting ring between the body flange and the plate.

5. The water supply coupling according to claim 1 comprising a groove in the tubular body disposed between the body flange and the second body end and a lock member adapted to fit into the groove so as to hold the mounting ring between the body flange and lock member.

6. The water supply coupling according to claim 1 comprising a plug having first and second plug ends, the first plug end having a central hole for slidably engaging the tubular body and the second plug end having a plug member for selectively sealing the central bore.

7. The water supply coupling according to claim 1 wherein the surface of the annulus is shaped to mate with the surface configuration of the check member to form a seal therebetween.

8. The water supply coupling according to claim 1, wherein said material for said check member is a thermoplastic material.

9. The water supply coupling according to claim 1, wherein the check member is a spherical check ball.

10. The water supply coupling according to claim 1, wherein the check member includes a hemispherical seating portion for sealing against the annulus in the closed position and a stem portion projecting from the seating portion.

11. The water supply coupling according to claim 1, wherein the check member includes a seating portion for sealing against the annulus in the closed position, and a stem projecting outwardly from the seating portion, and wherein a separate base is interposed between the check member and the spring.

12. A recreational vehicle comprising:
    a wall having opposite interior and exterior sides,
    a pressurized plumbing system located on the interior side of the wall,
    a water coupling mounted to the wall for access from the exterior side of the wall to permit delivery of water to the plumbing system, the coupling having a body configured to be mounted through the wall, the body having first and second body ends and a central bore, the central bore having a first bore end for receiving fluids and a second bore end for attaching to and delivering fluids to the pressurized plumbing system,
    a sealing annulus formed in the central bore between the first and second bore ends,
    a check member disposed in the bore for movement between an open position away from the sealing annulus wherein water may be introduced into the plumbing system and a closed position seated against the sealing annulus wherein water may not flow through the body, the check member being formed of a unitary rubberized material for forming a seal with the sealing annulus and prevent depressurization of the plumbing system through the water coupling,
    a spring disposed in the bore between the check member and the second bore end for biasing the check member toward the closed position,
    a ring member slidably insertable into the bore between the spring and the second bore end wherein the ring member seats against the pressurized plumbing system in use so as to secure the ring member in the bore and resist the biasing force of the spring,
    the tubular body has external threads at the second body end for attachment to the pressurized plumbing system and an outwardly projecting body flange projecting outwardly from the first body end, and
    a mounting ring having an inwardly projecting mounting ring flange and a central passage for slidably and rotatably engaging the periphery of the tubular body and limiting movement between the tubular body and mounting ring in response to engagement between the body flange and mounting ring flange.

13. The water supply coupling according to claim 12 wherein the mounting ring has at least one hand-manipulable ridge to facilitate rotation of the mounting ring.

14. The water supply coupling according to claim 12 wherein the mounting ring bore has interior threads for connection to a water supply in response to rotation of the mounting ring.

15. The water supply coupling according to claim 12 comprising a plate having a central hole for slidably engaging the periphery of the tubular body and fastening holes for attachment to the vehicle wall wherein the plate is disposed along the tubular body so as to hold the mounting ring between the body flange and the plate.

16. The water supply coupling according to claim 12 comprising a groove in the tubular body disposed between the body flange and the second body end and a lock member adapted to fit into the groove so as to hold the mounting ring between the body flange and lock member.

17. The water supply coupling according to claim 12 comprising a plug having first and second plug ends, the first plug end having a central hole for slidably engaging the tubular body and the second plug end having a plug member for selectively sealing the central bore.

18. The water supply coupling according to claim 12 wherein the surface of the annulus is shaped to mate with the surface configuration of the check member to form a seal therebetween.

19. The water supply coupling according to claim 12, wherein said material for said check member is a thermoplastic material.

20. The water supply coupling according to claim 12, wherein the check member is a spherical check ball.

21. The water supply coupling according to claim 12, wherein the check member includes a hemispherical seating portion for sealing against the annulus in the closed position and a stem portion projecting from the seating portion.

* * * * *